(No Model.)

J. T. SMITH.
UMBRELLA AND PARASOL HANDLE.

No. 289,722. Patented Dec. 4, 1883.

Witnesses.

Inventor.
James T. Smith
By his Att'y,

UNITED STATES PATENT OFFICE.

JAMES THOMAS SMITH, OF NEW YORK, N. Y.

UMBRELLA AND PARASOL HANDLE.

SPECIFICATION forming part of Letters Patent No. 289,722, dated December 4, 1883.

Application filed September 21, 1883. (No model.)

*To all whom it may concern:*

Be it known that I, JAMES T. SMITH, a citizen of the United States, residing at New York, in the county of New York and State of New York, have invented certain new and useful Improvements in Umbrellas, &c.; and I do hereby declare the following to be a full, clear, and exact description of the invention, such as will enable others skilled in the art to which it appertains to make and use the same.

My present invention consists in an improvement in the umbrella-shank for which Letters Patent were granted me July 31, 1883. In said patent the shank is described and claimed as being composed of an exterior wooden shell and an interior metal tube. As there stated, by placing the metal in the interior the least amount of metal necessary to give the required strength with the least weight was obtained, and other advantages of having the inner tube metallic and inclosed in a wooden shell were set forth.

My present improvement consists in making the inner tube entirely of wood and inclosing it in another wooden tube, the object being especially to utilize those species of wood which grow in the form of tubular reeds, such as tonquin, caroline, partridge, hairwood, rajah, and all other kinds of bamboo, and other reeds. Also, by this means, this advantage is gained, that the two shells or strongest parts are retained, while the weight is reduced without any loss of strength; and, still further, any trouble arising in the cutting and preparation of the stick with metal tubes is obviated.

Figure 1:
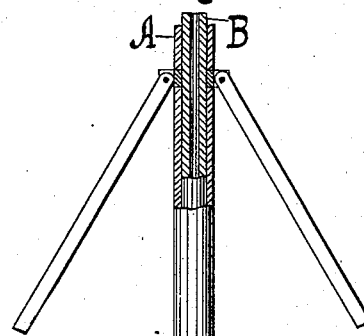
Figure 2:

I have illustrated my improvement in the accompanying drawings, in which Figure 1 represents the long shank of an umbrella partly in section in order to show its construction, and Fig. 2 is a cross-section of the same.

In said figures A represents the outer shell of the shank, and B the inner tube. The respective tubes are so selected and prepared that the inner tube may be slid or forced into the outer one, and the two held together without any additional means; or, if desired, the outer tube may be reduced by boring the stick longitudinally, in which may be inserted the inner wooden tube, and both may be joined by cement or any suitable fastening. It may be that imitations of these tubes in appearance, strength, and other qualities might be formed of leather, celluloid, or some similar material. In such case, where the tubes are composed of materials which possess all the advantages that I claim for wood and are arranged as I arrange them, I regard them as equivalents of my improvement. Canes and similar articles may be formed in the same manner as these umbrella-shanks.

The ends of canes and umbrellas may be formed solid for the handles or for the attachment of ferrules either by the extension of the outer tube, if desired, or by other similar means.

The notch in umbrellas, to which the ribs are attached, may be applied in the manner set forth in my patent above mentioned.

Having thus described my invention, what I claim as new, and desire to secure by Letters Patent, is—

The stick composed of an exterior wooden tube and an interior wooden tube, substantially as and for the purpose herein specified.

In testimony whereof I affix my signature in presence of two witnesses.

JAMES THOMAS SMITH.

Witnesses:
C. D. LANSING,
W. S. MARSH.